United States Patent
Jeske

(10) Patent No.: US 10,148,165 B2
(45) Date of Patent: Dec. 4, 2018

(54) SYSTEM FOR HARMONIC CONTENT CORRECTION IN POWER ELECTRIC CIRCUIT, SYSTEM FOR ELECTRIC ENGINE CONTROL, AND COOLING COMPRESSOR

(71) Applicant: Whirlpool S.A., Sao Paulo (BR)

(72) Inventor: Edson Jeske, Sao Paulo (BR)

(73) Assignee: Whirlpool S.A., Sao Paulo-SP (BR)

( * ) Notice: Subject to any disclaimer, the term of this patent is extended or adjusted under 35 U.S.C. 154(b) by 0 days.

(21) Appl. No.: 15/371,749

(22) Filed: Dec. 7, 2016

(65) Prior Publication Data

US 2017/0194852 A1    Jul. 6, 2017

(30) Foreign Application Priority Data

Dec. 9, 2015    (BR) .......................... 10 2015 030840

(51) Int. Cl.
| | |
|---|---|
| H02P 21/06 | (2016.01) |
| H02M 1/12 | (2006.01) |
| F25B 49/02 | (2006.01) |
| H02P 27/06 | (2006.01) |
| H02M 1/32 | (2007.01) |

(52) U.S. Cl.
CPC .............. *H02M 1/12* (2013.01); *F25B 49/025* (2013.01); *H02M 1/126* (2013.01); *H02P 27/06* (2013.01); *F25B 2600/0253* (2013.01); *H02M 2001/327* (2013.01)

(58) Field of Classification Search
CPC ...... H02P 21/06; H02P 23/08; H02P 2207/01; H02P 21/085; H02P 27/08
USPC .......................... 318/629, 632, 798, 800, 801
See application file for complete search history.

(56) References Cited

U.S. PATENT DOCUMENTS

| | | | | |
|---|---|---|---|---|
| 4,805,082 A | * | 2/1989 | Heinrich ............. | H02M 5/4505 363/129 |
| 5,994,869 A | * | 11/1999 | Becerra ................... | H02P 6/085 318/729 |
| 2011/0007530 A1 | * | 1/2011 | Swamy ................... | H02M 1/36 363/37 |
| 2012/0158245 A1 | * | 6/2012 | Yoshizawa .............. | B60R 16/03 701/36 |
| 2014/0285126 A1 | * | 9/2014 | Konig ................... | H02P 29/027 318/400.3 |

* cited by examiner

*Primary Examiner* — Rina Duda
(74) *Attorney, Agent, or Firm* — Harrington & Smith

(57) ABSTRACT

The present invention relates to the field of power electronics and electric engines, and describes a harmonic content correction system in power systems. The invention solves the space and weight problem associated with the core of a harmonic content correction inductor, also providing performance advantages of electric engines, such as higher available voltage at full load and higher rotational speed at full load. The invention is particularly useful in refrigeration compressors comprising a switching device my associated with a reactive element.

3 Claims, 2 Drawing Sheets

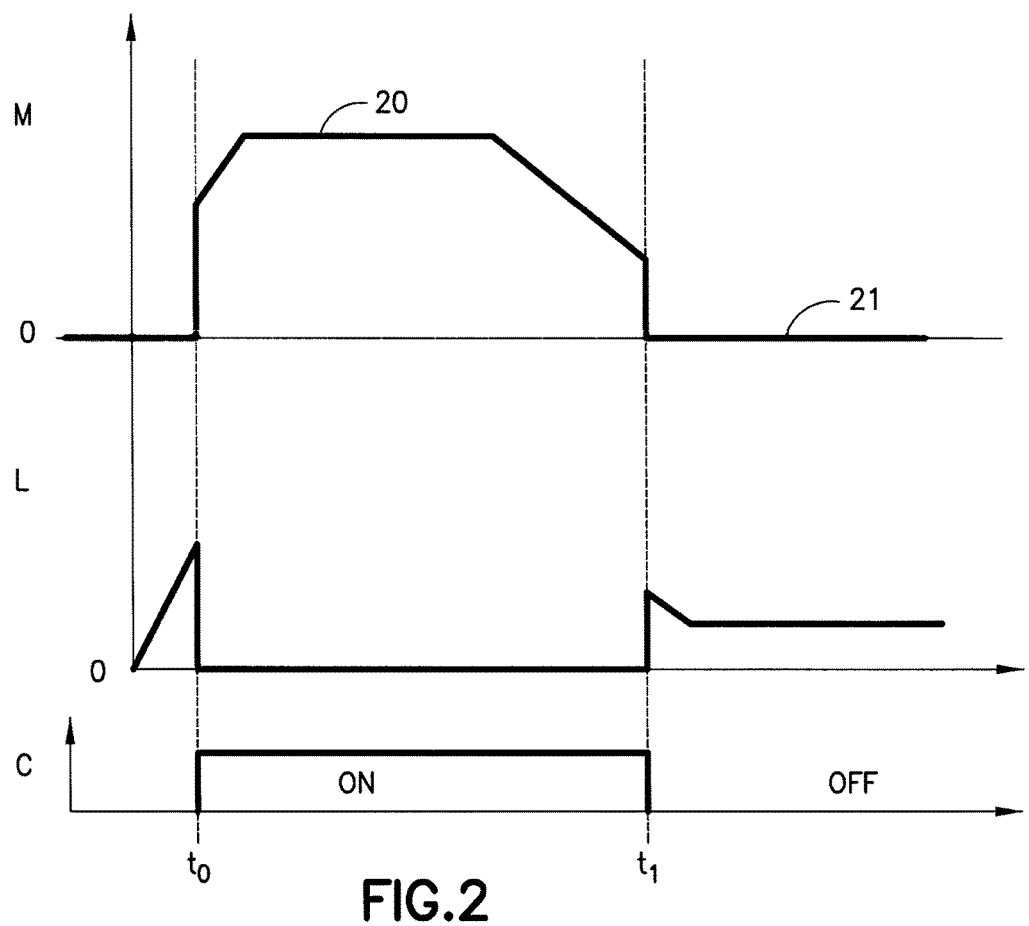

SYSTEM FOR HARMONIC CONTENT CORRECTION IN POWER ELECTRIC CIRCUIT, SYSTEM FOR ELECTRIC ENGINE CONTROL, AND COOLING COMPRESSOR

FIELD OF THE INVENTION

The present invention is in the fields of power electronics and electric engines. More specifically, the present invention describes a harmonic content correction system in an electric power circuit, a system for controlling electric engines and a compressor for refrigeration. The system of the present invention provides the protection of a reactive component (L) and avoids its oversizing. The invention is particularly useful in the control of electric engines of compressors.

BACKGROUND OF THE INVENTION

Currently, various types of electric engines, usually alternating current engines, use a device called a frequency inverter to control the engine, such as speed control, starting, and other parameters.

However, inverters have a non-linear voltage and current function, i.e., they do not obey a straight line. Non-linear elements act on their power network contaminating it with a large number of low-order harmonics, distorting the power supply and causing a reduction in power quality and over-dimensioning of the distribution network.

Due to the effect of current and voltage distortions, there may be an increase in electrical losses in the installations and the overheating of its components (cables, transformers, capacitor bank, engines, etc.) as well as a reduction of the power factor. power rating. Taking into account these circumstances, a reactive element, such as an inductor, is added at the input of the network to provide a reduction in the harmonic content.

Power systems can be any type of electric engines, refrigerators, compressors and/or other devices that absorb and dissipate power. Specifically, in high power dissipating circuits, high electric currents pass through said inductor, which dissipates high amount of energy in the form of heat. The dimensioning of this inductor in order to maintain its inductance characteristics, even for transient regimes, directly impacts the inductor core, and thus the inductor size and energy dissipation. Thus, the inductor occupies a larger space in a circuit, making it expensive, heavy and/or very bulky, often making the equipment economically unfeasible or resulting in higher energy consumption.

The present invention provides a solution to these problems. From the literature reviewed, no documents were found anticipating or suggesting the teachings of the present invention, so that the solution proposed here has novelty and inventive step in the eyes of the prior art in the eyes of the inventors.

SUMMARY OF THE INVENTION

The present invention aims to solve the problems in the prior art from a system for correction of current harmonic content in power systems which is characterized in that it comprises at least one switching device (M) associated with Less a reactive element (L), protecting said inductor and avoiding oversizing thereof. The switching is intended to protect the inductor from operating beyond its operational limits. For example, when current or power exceeds its limit. This protection facilitates the design and use of an inductor suitable for steady state operation. This also provides a system with smaller dimensions, weight, and cost over conventional inductors.

The inventive concept common to all claimed protection contexts relates to an electric engine control system which avoids overloading and oversizing of a first reactive component (L) used for the reduction of harmonic content, through a (M) which protects the reactive component (L) so that it operates in the regime condition (21) without over-sizing.

One of the objects of the present invention is a system for correcting harmonic content of current in an electric power circuit comprising a switching device (M) associated with a reactive element (L).

Another object of the present invention is a system for controlling electric engines comprising a circuit for correcting harmonic current content provided with a switching device (M) associated with a reactive element (L).

It is another object of the present invention to provide a refrigeration compressor comprising an electric engine control system having a circuit for correcting current harmonic content, comprising a switching device (M) associated with a reactive element (L).

These and other objects of the invention will be readily appreciated by those skilled in the art and by companies having interests in the art and will be described in sufficient detail for their reproduction in the following description.

BRIEF DESCRIPTION OF THE FIGURES

The following figures are presented in order to better define and clarify the contents of the present patent application:

FIG. 2 shows comparative electrical current plots flowing in the first reactive component (L) and the switching device (M), as well as the operation graph of the controller (10).

DETAILED DESCRIPTION OF THE INVENTION

Figure 1:
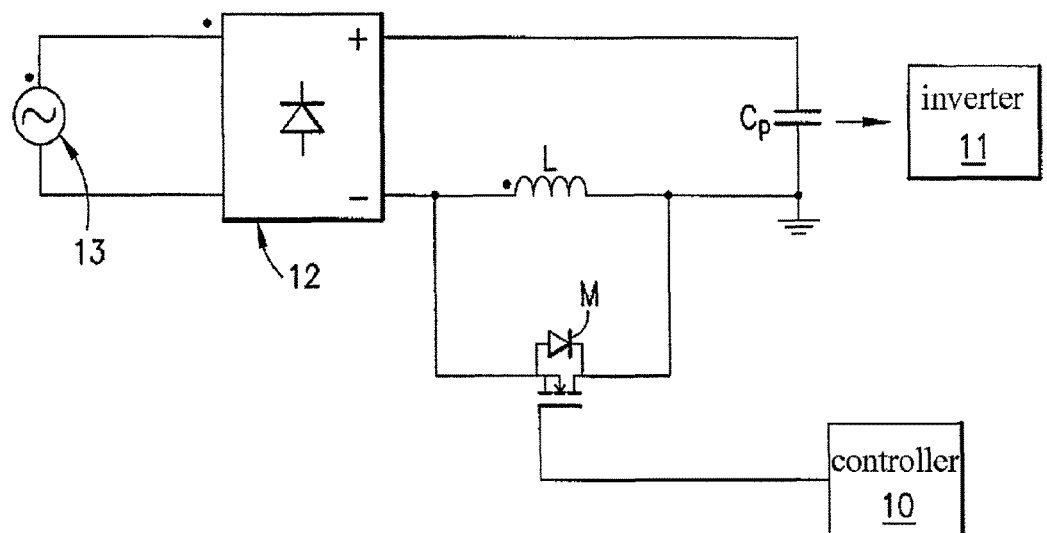
FIG. 1 shows a diagram of one embodiment of the system shown in the present invention.

In various applications connected to electric power systems, the electric engine has a variation in its consumption current, that is, said engine uses an operation current and, at a certain moment, it needs more power, impacting in an increase of current. This increase is momentary and usually has a short duration.

The present invention provides a system for correction of current harmonic content in power systems which is characterized in that it comprises an inductor sized to operate in a duty cycle, being protected by a switching device (M), which allows the inductor to have smaller dimensions, weight, and cost over conventional inductors.

One of the objects of the present invention is a system for correcting harmonic current content in an electric power circuit comprising a switching device (M) associated with a reactive element (L).

In one embodiment, said system comprises:
 a. at least one grinding system;
 b. at least one first reactive component (L) for reducing the harmonic content;
 c. at least one second reactive component ($C_p$);
 d. at least one switching device (M) associated with the first reactive component (L);
 e. at least one controller associated with said switching device (M); and f. at least one converter for engine control.

In one embodiment, said first reactive component is an inducer. In one embodiment, said switching device is a relay, a logic switch, a timer, a MOSFET, or a combination thereof. In one embodiment, said converter is a frequency inverter.

In one embodiment, the control system rectifies the signal from the power source 13, directs the rectified signal to the second reactive component ($C_p$) and forwards it to an inverter (11). Depending on a signal, which may be time, an electrical signal resulting from an increase in voltage or other signal related to the occurrence of a maximum load regime, the switching device (M) is actuated, so that the current does not pass through the inductor L). When the switching device (M) is deactivated, the current passes through the inductor (L).

Another object of the present invention is a system for controlling electric engines comprising a circuit for correcting harmonic current content provided with a switching device (M) associated with a reactive element (L).

Another object of the present invention is a refrigeration compressor comprising an electric engine control system having a circuit for correcting current harmonic content including a switching device (M) associated with a reactive element (L).

In one embodiment, the compressor is of variable capacity. In one embodiment, the compressor has an inductor (L) which does not receive current during the pull-down cycle (10) of the compressor due to the actuation of the switching device (M), providing, among other advantages, the operation of the rotary compressor at a maximum load higher than that obtained when an inductor associated with the switching device is not used.

The system of the invention is applicable to various electric power systems, such as electric engines—including compressor engines for refrigeration.

Electric engines used in refrigeration compressors, for example, are subjected to two cycles: the pull-down cycle (10) and the regimen cycle (11), or normal cycle of operation. The pull-down cycle 10 consists in lowering the temperature of the refrigerator according to a desired temperature, which occurs at the time the refrigerator is first started, or when the refrigerator is switched off for a long time. Therefore, the pull-down cycle (10) does not occur during the operation of the refrigerator. However, such a cycle requires a high power and an intense electric current, which generally implies in the oversizing of the inductor for the harmonic content correction of current.

The following examples are presented for the sole purpose of facilitating understanding of the inventive concept of the present invention in some of its embodiments and should not be construed as limiting the scope of the invention.

Example 1—System for Correction of Harmonic Content of Current in Power Electric Circuit in a Refrigeration Compressor The present invention provides a harmonic content correction system in power electrical circuits comprising an inductor (L) as the reactive component. The core of said inductor is provided with reduced dimensions, however meeting the requirements of electric current in the normal load regime. In this embodiment, when the regime is full-load or pull-down (10), the maximum engine operating temperature also occurs. In this embodiment, the inductor (L) does not receive current due to the actuation of the switching device (M), which protects the inductor. With this, the inductor is sized for operation in the normal regime of a variable capacity compressor.

Referring to FIG. 1, it will be appreciated that in this embodiment of the invention, overloading and oversizing of the first reactive component (L) is avoided due to the combination of a grinding system (12); A first reactive component (L), a second reactive component ($C_p$), a switching device (M), a control system (10) and an inverter (11).

The grinding system (12) is interconnected to an alternating current source (13), which is the power grid itself. The grinding system 12 rectifies the alternating signal coming from the source 13 by converting it to DC signals. A second reactive component ($C_p$) is associated with the grinding system (12) and the inverter (11), so that the second reactive component ($C_p$) acts as a frequency filter.

A first reactive component (L) is associated with the second reactive component ($C_p$) and the inverter (11). Such a reactive component (L) in one embodiment is an inducer. Thus, said inductor (L) is arranged to reduce the impact of the harmonic content, the current of the inverter (11) and the reactive component ($C_p$) in the electric network (13).

In many applications, the electric engine exhibits a variation in its current of consumption, that is, said engine uses an operation current and, in rare moments, it needs more power, impacting on an increase of current, in which this increase is momentary and has a short duration. In order to avoid that said inductor (L) has a very high geometry, because it is sized to withstand this current increase, and that an overload thereof occurs, a switching device (M) is associated with said inductor (L), So that both are connected in parallel. A controller (10) is associated with said switching device (M).

In one embodiment, said switching device (M) is a selected from: is a relay, a logic switch, a timer, a MOSFET, or a combination thereof.

The controller (10) is configured to drive the switching device (M), which can be done in a number of ways. In one embodiment, the drive is given over a predetermined time, signaling a thermostat, energizing the system, engine torque, inverter power, or any signal associated with the start and/or end of the cycle of an electric engine or pull down (20) from a refrigerator. In one embodiment, the controller 10 detects the start of the pull-down cycle 20 from reading the power of the inverter 11, since when the cooler enters the pull-down cycle 20, the same Needs more power. As a result, at the time the controller 10 detects that the power of the inverter 11 exceeds a predetermined value, it sends a control signal to the switching device M, to return through said switching device (M). That is, when the switching device (M) enters the circuit, the first reactive element (L) is deactivated, i.e., taken out of operation.

The drive control characteristic of the switching device (M) protects the inductor (L) and enables its sizing to operate in the system cycle (21), as the high currents of the pull-down cycle (20) pass through the Switching device (M). In this way, the inductor (L) is operated with a lower electric current, having a reduced size and, consequently, a lower manufacturing cost, due to the fact that the amount of material to produce said inductor (L) is reduced. In addition, the energy dissipation in the inductor is smaller, providing better energy efficiency to the assembly.

FIG. 2 shows a graph for the comparison of the electric current in the switching device (M) and the first reactive component (L). It is known that when the controller 10 is actuated in the pull-down cycle 20 the current passes through the switching device M and not the first reactive component L. At the time the cooling system returns to the duty cycle 21, the switching device M is deactivated and the current flows back through the first reactive component L.

2, the controller 10 graph shows that it sends an ON signal to the switching device M, and thereafter sends a "OFF" shut-off signal to the controller. Said switching device (M). The controller 10 detects the moment when the power of the inverter 11 is below a predefined value so as to send the OFF signal.

The present invention also provides a method of controlling electric engines wherein it comprises dimensioning a first reactive element (L) for operation in a duty cycle (21). Thereby, the system is started and comprises the step of rectifying the signal from the mains (13) through a rectifying system (12), converting said signal to DC.

The signal is then directed to a second reactive component ($C_p$), in which it is routed to an inverter (11). The controller 10 detects the start of the pull-down cycle 20 of the cooler, and drives the switching device M, causing the current of the pull-down cycle 20 to travel through said switching device M).

In one embodiment, the start of the pull-down cycle (20) is associated with the power variation of the inverter (11), thus, at the time when the power value of the inverter (11) is greater than a value of the controller (10), it actuates the switching device (M), causing the current to travel therethrough.

The controller detects the end of the pull-down cycle (20), and thus, sends a control signal to the switching device, disabling it. Thus, in the embodiment of the pull-down cycle 20 associated with the power of the inverter 11, at the moment when the power of the inverter 11 is less than a predetermined value, the control system 10, Disengages the switching device (M), causing the current to pass through the first reactive component (L).

In this way, the solution proposed in the present invention allows the first reactive component (L) to be sized to operate in the regime current (21), which is the normal operating current of an engine. The first reactive element (L) thus comprises a reduced size and a reduced manufacturing cost due to the fact that it requires less material to produce the same.

In the present invention, the control system is of a reduced size and weight, respecting the conditions of operation of the compressor during the pull-down cycle (10) of, for example, a refrigerator, to which the variable capacity compressor is installed. Among other advantages deriving from the use of this inductor for a compressor of variable capacity, the increase of the capacity (rotation) of the compressor at maximum load deserves to be highlighted, since the inductor has a low inductance and the impact on the available voltage drop for the compressor becomes smaller. The invention provides detectable decrease of the inductance during the maximum load operating regime. The maximum load rotation is greater than that obtained when the system of the invention is not used.

Those skilled in the art will appreciate the knowledge presented herein and may reproduce the invention in the embodiments presented and in other embodiments, falling within the scope of the appended claims.

The invention claimed is:

1. A system for correcting harmonic current content in an electric power circuit comprising:
   a. at least one rectifier;
   b. at least one inductor for reducing the harmonic content;
   c. at least one capacitor;
   d. at least one switching device associated with the at least one inductor;
   e. at least one controller associated with the at least one switching device; and
   f. at least one frequency inverter for electric motor control, wherein the system:
       rectifies the signal from a power source, directs the rectified signal to the at least one capacitor and forwards it to at least one inverter;
   characterized in that:
       a signal from the at least one controller activates the at least one switching device, causing the current to divert from the at least one inductor and pass only through the at least one switching device to provide maximum power output, and
       a signal from the at least one controller disengages the at least one switching device, causing the current to pass through the at least one inductor to provide average power and reduced harmonic current content;
       wherein the signal received by the at least one controller to activate the switch-on and/or switch-off signal to the at least one switching device, is selected from: over a predetermined time; signaling a thermostat; energizing the system; engine torque; power through the frequency inverter; a signal associated with the start and/or end of the maximum charge cycle of an electric motor or pull down of a refrigerator;
       wherein the at least one inductor is without current during the pull-down cycle of the refrigerator to provide maximum load rotation to at least one refrigeration compressor.

2. The system according to claim 1, characterized in that the at least one switching device is a relay, a logic switch, a timer, a MOSFET, or a combination thereof.

3. The system according to claim 1, characterized in that the refrigeration compressor is a variable capacity compressor.

* * * * *